3,413,040
TRACTOR PROTECTING VALVE
Charles Horowitz, Niles, Ill., assignor to Berg Mfg. & Sales Co., Des Plaines, Ill., a corporation of Illinois
Filed Dec. 9, 1966, Ser. No. 600,635
5 Claims. (Cl. 303—29)

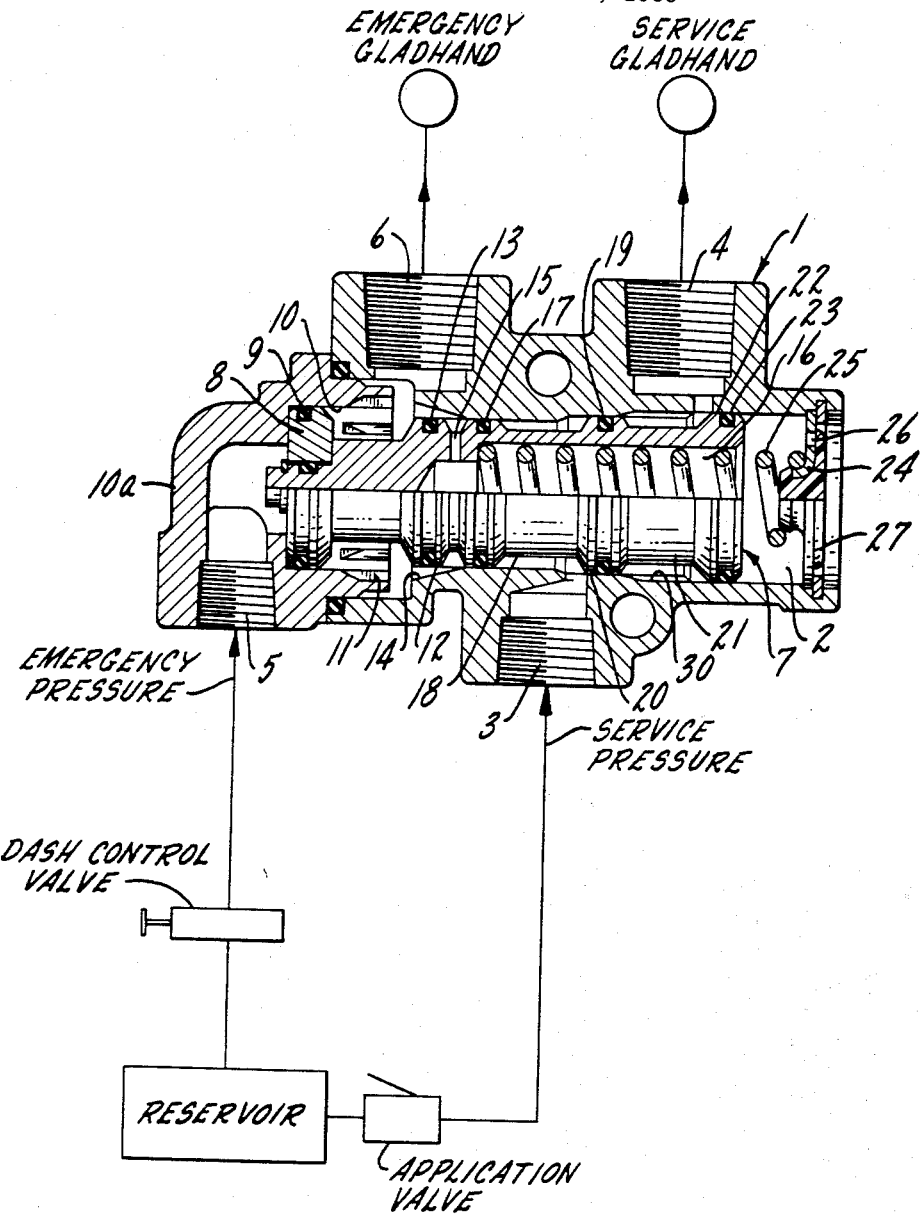

ABSTRACT OF THE DISCLOSURE

This invention relates to vehicle air brake systems and has particular relation to means for protecting the air braking system of a tractor in a tractor-trailer vehicle combination.

---

One purpose of the invention is to provide a tractor-protecting valve effective to protect the air system of a tractor wherein said system may include a control valve of varying capabilities.

Another purpose is to provide a tractor-protecting valve having exhaust means effective to exhaust the emergency system which is downstream of said valve.

Another purpose is to provide a tractor-protecting valve requiring a given pressure for opening the same and a lesser pressure for maintaining the same in open position.

Another purpose is to provide a tractor-protecting valve requiring a given pressure for opening the same and a leser pressure for maintaining the same in open position.

Another purpose is to provide a tractor-protecting valve including means insuring against delivery of fluid pressure to a trailer system until a safe pressure is present in the tractor system.

Other purposes may appear from time to time during the course of the specification and claims.

The invention is illustrated more or less diagrammatically in the accompanying drawing, wherein:

The figure is a side elevation in cross section of the valve and including a schematic showing of the air systems, on a reduced scale, with which said valve is employed.

Like parts are indicated by like numerals throughout the specification and drawing.

Referring now to the drawing, the valve of the invention includes a valve housing or body 1. The valve body 1 defines an elongated valve chamber 2. A service pressure inlet 3 communicates with the chamber 2 at an intermediate point thereof. A service outlet 4 communicates with the opposite side of chamber 2 at a point spaced therealong from the point of communication of inlet 3. An emergency pressure inlet 5 communicates with chamber 2 and, as shown, communicates with one end portion thereof. An emergency pressure outlet 6 communicates with chamber 2 at a point between the point of communication of inlets 3 and 5.

Reciprocal within chamber 2 is a valve piston or shuttle valve member indicated generally by the numeral 7. It will be observed that the wall defining chamber 2 has portions of varying diameter, as will be described in greater detail hereinbelow, and that valve piston 7 has correspondingly varying surfaces.

One end of piston 7 carries the enlarged diameter head 8 which in turn carries an O-ring seal 9 in engagement with an inner cylindrical wall surface 10. The wall surface 10 has a rearmost portion grooved as indicated at 11, the purpose of which will appear hereinbelow. Rearwardly spaced from the head 8 the valve piston member 7 carries a second cylindrical surface 12 which in turn carries an O-ring seal 13. The surface 12 and seal 13 are of lesser diameter than head 8 and seal 9. The chamber-defining inner wall of housing 1 is conically enlarged adjacent and beyond the inlet 6 from surface 10, as indicated at 14. An exhaust passage 15 penetrates the circumferential wall of piston 7 rearwardly of seal 13 to communicate outlet 6, through the mediacy of conical enlargement 14, with a well 16 formed in piston 7, when the piston 7 is in the position shown in the figure. Rearwardly of exhaust passage 15 the valve piston 7 carries a seal 17. A reduced portion 18 of piston 7 overlies the point of communication of inlet 3 and is bounded on opposite sides by seal 17 and by a fourth seal 19 carried in an enlargement 20 on piston 7. A second reduced portion 21 of piston 7 joins enlargement 20 with an end enlargement 22 of piston 7, the seal 23 being carried by enlargement 22 and engaging an opposed cylindrical inner surface portion defining an end portion of chamber 2.

A spring-retainer plate 24 is held in the otherwise open end of chamber 2 and spring 25 has one of its ends engaging the inner surface of retainer 24, the spring 25 extending into well 16 and having its opposite end engaging piston 7 to urge the same in a direction away from retainer 24 and toward inlet 5. Retainer 24 is apertured at 26 and a dust-excluding flapper or check valve member 27 is carried externally of retainer 24 to position a flexible portion thereof over aperture 26.

The wall defining chamber 2 has grooves 30 formed therein adjacent outlet 4 and between outlet 4 and inlet 3, the purpose of which will appear hereinbelow.

For ease of assembly it has been found preferable to form the head 8 separate from piston member 7 and to removably secure the same thereto. Similarly, it has been found preferable to form the closure element 10a separately of valve body 1 to provide for the enlarged cylindrical surface 10 and grooved portion 11.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

As will be observed from the labeled schematic showing in the figure, an air pressure tank or reservoir has a conduit communicating with a manually operable dash control valve, said control valve in turn having a conduit communicating with emergency pressure inlet 5. A second set of conduits communicate the air pressure reservoir with an application valve and the application valve with service pressure inlet 3. Emergency pressure outlet 6 communicates through a suitable conduct with an emergency gladhand connector designed for engagement with a similar connector on a trailer. So too, a suitable conduit communicates service pressure outlet 4 with a service gladhand connector designed for engagement with a similar gladhand connector on a trailer.

The yielding means, or spring 25, is effective, in the absence of countervaling pressure, to position the shuttle or piston valve member 7 in the position shown in the drawing. The force of spring 25 and the diameter of seal 9 are such as to require a pressure of the order, for example, of 55 to 60 pounds per inch at inlet 5 in order to move piston valve member 7 against the action of spring 25 or to the right as the parts are shown in the drawing. Thus protection against release of brakes, with less than a predetermined safe pressure in the system, is assured.

When the member 7 has been moved a sufficient distance in said direction, seal 9 will engage the lands between grooves 11 and fluid pressure at inlet 5 will be free to flow through the grooves 11, about the seal 9 and through outlet 6 to the emergency gladhand and to the emergency system of the trailer. Such movement of piston 7 was effective, also, to cause seal 13 to move beyond the conical enlargement 14 and to engage the adjacent cylindrical wall surface of chamber 2 and thus to close exhaust passage 15 and to seal pressure entering at inlet 5 against escape other than through outlet 6. Such movement of piston valve member 7 was also effective to move seal 19 into engagement with the lands between grooves 30 and to open communication between service pressure inlet 3 and service pressure outlet 4 through grooves 30 and thus to supply service pressure to the service gladhand and to the service system of the trailer.

With the piston valve member 7 thus moved to the right, the system is in operation and the valve member 7 will remain in such position, being maintained therein by the pressure in the system. In such position operation of the application valve is effective to supply service pressure through the valve of the invention to the brakes of the trailer for normal service operation. Similarly, the emergency pressure system, including the dash control valve shown, is readily available for employment as needed.

Should there be, however, a failure in the trailer system, it becomes encumbent, in the interest of safety, to preserve the tractor system.

Two types of dash control valves are conventionally available. The less expensive type may be considered a two-position or "on-off" valve in which the operator either opens or closes communication between the reservoir and the emergency pressure system. The other, more expensive type of dash control valve includes an automatic shutoff structure effective to close communication between the reservoir and the emergency pressure system in response to drop in reservoir pressure below a predetermined value.

The valve of the present invention may be employed with either said types of dash control valves, its ready, safe and effective employment with the less expensive "on-off" type being one of the advantages of the present valve. With a drop in pressure in the reservoir to a predetermined level of the order, for example, of 35 to 40 pounds, the spring 25 is effective automatically to move the valve piston shuttle member 7 to the position shown in the drawing. While a pressure of the order of 55 to 60 pounds was required to move the member 7 toward open position, the lesser diameter of seal 13 is such as to provide for retention of member 7 in said open position until the pressure in the reservoir and thus at inlet 5 is reduced to that of an order of 35–40 pounds.

With the member 7 in the position shown in the drawing, seal 9 is effective to prevent any further loss of fluid from the tank reservoir through outlet 6. The exhaust passage 15, well 16 and exhaust aperture 26 are placed in communication with outlet 6 to bleed any pressure trapped between outlet 6 and the remainder of the emergency system and thus to trigger the emergency application of brakes in a system designed for said result and, in any event, to bleed off any trapped pressure downstream of outlet 6 and the emergency gladhand shown. The dust protector 27 flexes outwardly to let air exhaust through opening 26, but seals said opening against ingress of dust and dirt. With the member 7 in the position shown, also, seal 19 has been again moved into sealing position between service pressure inlet 3 and outlet 4 to preserve the reservoir against any further loss of pressure through the application valve and the service conduits communicating the application valve with the reservoir and service inlet 3. Thus, with a dash control valve of the "on-off" type, the tractor system will be protected against further loss of pressure from its reservoir, whether said dash control valve is manually moved to the "off" position or not. If the automatic shutoff type dash control valve is employed, the valve of the present invention provides an additional, automatic assurance of protection for the system.

What is claimed:

1. A tractor protecting valve including a housing, a chamber in said housing, a plurality of ports in said housing and communicating with said chamber, said ports including a service inlet and outlet, an emergency inlet and outlet and an exhaust port, a shuttle valve member reciprocal in said chamber, seals spaced on said member, a spring urging said member toward a first position, said seals closing communication between said emergency inlet and outlet ports and between said service inlet and outlet ports when said member is in said first position, a passage positioned in said member to open communication between said emergency outlet and exhaust ports when said member is in said first position, said member being movable toward a second position in response to fluid pressure entering one of said inlet ports, said seals being positioned to open communication between said emergency inlet and outlet ports and between said service inlet and outlet ports and to close communication between said emergency outlet and exhaust ports when said member is in said second position.

2. The structure of claim 1 wherein said shuttle valve member includes an enlarged surface carrying one of said seals and a lesser surface spaced on said member and carrying another of said seals, said enlarged surface and its seal being presented to said last-named inlet port when said member is in said first position, said lesser surface and its seal being presented to fluid pressure entering said last-named inlet when said member is in said second position, whereby said member is movable toward said second position, against the action of said spring in response to pressure initially entering said last-named inlet above a first predetermined level and said member is retainable in said second position in response to pressure entering said last-named inlet above a second predetermined level.

3. The structure of claim 1 wherein one of said seals engage said chamber between said service inlet port and said emergency outlet port to seal said last-named ports against communication therebetween at all positions of said member.

4. The structure of claim 1 wherein some of said seals are positioned, at all positions of said member, to preclude communication between said service inlet and outlet ports with said exhaust port.

5. The structure of claim 1 characterized by and including a flexible wall member overlying said exhaust port externally of said housing and movable away from said exhaust port in response to fluid pressure emanating therefrom to communicate said exhaust port with atmosphere.

References Cited

UNITED STATES PATENTS

| | | | |
|---|---|---|---|
| 3,104,133 | 9/1963 | Valentine | 303—29 X |
| 3,183,919 | 5/1965 | Herring | 303—84 X |

DUANE A. REGER, *Primary Examiner.*